Patented May 25, 1937

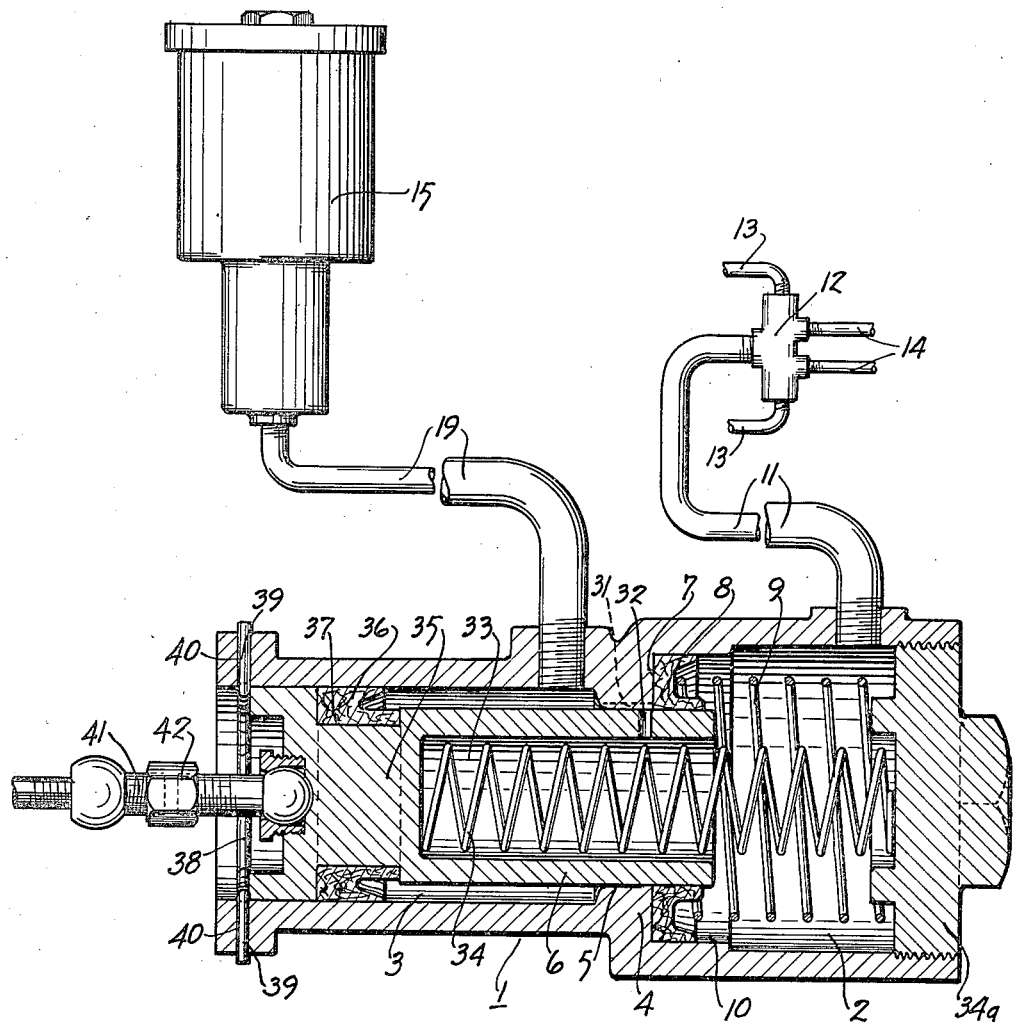

2,081,575

UNITED STATES PATENT OFFICE 2,081,575

FLUID BRAKE

Eugene G. Carroll, Los Angeles, Calif., assignor to Bendix Brake Company, South Bend, Ind., a corporation of Illinois Original application May 23, 1929, Serial No. 365,405. Divided and this application July 14, 1934, Serial No. 735,136

2 Claims. (Cl. 309—33)

This application is a division of my copending application Serial No. 365,405, and relates to brake apparatus for automobiles. Although features of the invention may be applied to pneumatic brake apparatus, the invention is expected to be especially useful when applied in connection with hydraulic brake apparatus. Such apparatus usually includes a master cylinder operated by a brake pedal which advances a plunger in the compression chamber of the master cylinder, thereby communicating the hydraulic pressure to the hydraulic brakes.

One object of the invention is to improve the construction of the master cylinder to insure the instant development of pressure at the brakes when the movement of the plunger of the master cylinder begins.

A further object of the invention is the improvement of the packing cups used in the cylinders, and to improve their assembly with the cylinders and pistons so as to improve the efficiency of the apparatus and to decrease the cost thereof.

Further objects of the invention will appear hereinafter.

The invention consists of the novel parts and combination of parts to be described hereinafter, all of which contribute to produce an efficient hydraulic brake apparatus.

A preferred embodiment of the invention is described in the following specification, while the broad scope of the invention is pointed out in the appended claims.

In the drawing:

The figure illustrates a hydraulic brake apparatus embodying my invention, the master cylinder being shown in longitudinal section. The piping connection leading to the reservoir and to the four brakes is indicated diagrammatically.

Referring more particularly to the parts, 1 represents the master cylinder which is formed at its inner end into a compression chamber 2, and toward its outer end with a booster chamber 3, the said chambers being separated by a rudimentary head 4 integral with the wall of the cylinder and provided with a bore 5 through the same for the plunger 6 that applies the braking pressure. The compression chamber 2 is of larger diameter than the booster chamber 3 so that an annular shoulder 7 is formed operating as a seat for a packing 8.

Such packing may be held in place by a coil spring 9. This packing seals the entire distance between the face of the tubular plunger 6 and the face of the counterbore 10 of smaller diameter than the bore of chamber 2. In other words, the packing packs the plunger 6 between the two chambers 2 and 3. The diameter of the booster chamber 3 is smaller even than the counterbore 10 but is larger than the plunger 6.

The chamber 2 is connected by a suitable piping with the brake apparatus at the wheels of the car. In the present instance, for example, a pipe 11 leads off from the chamber 2 to a header or manifold 12 that is connected by pipes 13 to the forward brakes, and by pipes 14 to the rear brakes.

The reservoir 15 supplies fluid to the booster chambers through a pipe connection 19 communicating with the booster chambers of the cylinder.

Head 4 between the chambers 2 and 3 is provided with a small port 31 that extends along the side of the tubular chamber 3 and the plunger 6 is formed with a shallow annular groove (not shown) registering with a small port 32 formed through the wall of the tubular plunger and communicating with a bore 33 within the plunger so that, regardless of the rotation of the plunger 6 relative to the cylinder when the plunger is in its withdrawn position, as indicated in the figure, this passage or port 31 is in communication with the small port 32 and with the bore 33. The plunger is open at its inner end so that this port 32, by communicating with the passage 31, opens communication between the chambers 2 and 3.

In order to hold the plunger 6 normally in its retracted position, the coil spring 34 may be provided to thrust against the head 35 of this plunger, the other end of the spring thrusting against a plug 34ª screwed into the inner end of the master cylinder. The head 35 fills the bore of the booster chamber 3, and is provided with a packing ring 36 in the form of a cup, which is of elastic material and is seated in an annular groove 37 formed in the head 35.

In order to prevent the plunger 6 from being thrust out of the bore 3 by this spring 34, I provide a keeper 38, this keeper being of any suitable construction, but in order to make it removable, I form it of spring wire bent into a bow, the ends of the bow terminating in integral spurs or pins 39 that are received in corresponding openings 40 drilled radially in the lap of the cylinder. The bow 38 fits closely to the bore of the cylinder and is in the path of head 35.

The plunger 6 may be actuated by a pedal through a connection 41 which may include an adjustable threaded coupling 42 for adjusting the position of the plunger in the bore 3.

The mode of operation of the apparatus illustrated will now be briefly stated. When the brakes are at rest, the plunger 6 is in the retracted position illustrated in the figure. At this time, the pressure existing in the reservoir 15 is communicated to the interior of the compression chamber 2 so that the same pressure is maintained in the chamber 2 as in the reservoir. It will be evident that as soon as the plunger 6 is moved toward the right to apply the brakes, the communication between the port 32 and the port 31 will be cut off. Hence, there is no outlet from the chamber 2 except through the pipe 11 to the brakes. Therefore, the pressure of the liquid in the compression chamber 2 and the pipe 11, and connected pipes, will immediately rise and apply the brakes.

It is to be understood that the embodiment of the invention described herein is only one of the many embodiments this invention may take, and I do not wish to be limited in the practice of the invention nor in the claims to the brake embodiment set forth.

What I claim is:

1. In hydraulic brake apparatus, a cylinder, a piston positioned in said cylinder and having a pair of heads in sliding contact with said cylinder, said piston being provided with a groove between said heads, and an elastic cup-shaped packing member which is annular, of which a radial cross section is U-shaped, and which is adapted to be slipped over one of said heads and into said groove, and in sealing engagement with said cylinder.

2. In hydraulic brake apparatus a cylinder having concentric bores of different diameters, a piston positioned in said cylinder and having a pair of heads of different diameters each in sliding contact with one of said bores and provided with a groove between its heads, an elastic cup-shaped packing member which is annular, of which a radial cross section is U-shaped, and which is associated with the smaller of said pistons to prevent the passage of liquid thereby in one direction, and a second elastic cup shaped packing member which is annular, of which a radial cross section is U-shaped, and which is adapted to be slipped over one of said heads and into said groove so as to be positioned in sealing engagement with the larger of said bores, whereby both of said heads are effectively sealed to prevent the passage of liquid in one direction.

EUGENE G. CARROLL.